(12) United States Patent
Harper et al.

(10) Patent No.: US 7,669,765 B2
(45) Date of Patent: Mar. 2, 2010

(54) RFID SWITCHING

(75) Inventors: Lawrence Edward Harper, Marietta, GA (US); Derry Thomas DeNise, Decatur, GA (US)

(73) Assignee: Winware, Inc., Marietta, GA (US)

( * ) Notice: Subject to any disclaimer, the term of this patent is extended or adjusted under 35 U.S.C. 154(b) by 470 days.

(21) Appl. No.: 11/622,827

(22) Filed: Jan. 12, 2007

(65) Prior Publication Data

US 2007/0115127 A1    May 24, 2007

Related U.S. Application Data

(63) Continuation-in-part of application No. 10/990,907, filed on Nov. 17, 2004, now Pat. No. 7,337,963.

(60) Provisional application No. 60/565,089, filed on Apr. 23, 2004.

(51) Int. Cl.
*G06F 19/00* (2006.01)
(52) U.S. Cl. ................... 235/385; 340/572.1
(58) Field of Classification Search ............ 235/492, 235/375, 385
See application file for complete search history.

(56) References Cited

U.S. PATENT DOCUMENTS

| 4,730,188 A | 3/1988 | Milheiser |
| 5,693,134 A | 12/1997 | Stephens |
| 6,127,938 A * | 10/2000 | Friedman ............... 340/693.6 |
| 6,182,053 B1 | 1/2001 | Rauber et al. |
| 6,195,006 B1 | 2/2001 | Bowers et al. |
| 6,549,891 B1 | 4/2003 | Rauber et al. |
| 6,596,200 B1 * | 7/2003 | Ogawa et al. ............... 252/512 |
| 6,681,990 B2 | 1/2004 | Vogler et al. |
| 6,693,539 B2 | 2/2004 | Bowers et al. |
| 6,708,879 B2 | 3/2004 | Hunt |
| 6,812,838 B1 | 11/2004 | Maloney |
| 7,518,516 B2 | 4/2009 | Azevedo et al. |
| 2001/0000019 A1 | 3/2001 | Bowers et al. |
| 2002/0118111 A1 | 8/2002 | Brown et al. |
| 2002/0183882 A1 | 12/2002 | Dearing et al. |
| 2002/0198795 A1 | 12/2002 | Dorenbosch |
| 2003/0034390 A1 | 2/2003 | Linton et al. |
| 2003/0116634 A1* | 6/2003 | Tanaka ................... 235/492 |
| 2005/0242950 A1 | 11/2005 | Lindsay et al. |
| 2006/0139180 A1* | 6/2006 | Smith et al. ............ 340/686.1 |

FOREIGN PATENT DOCUMENTS

WO    2005028165 A1    3/2005

* cited by examiner

*Primary Examiner*—Seung H Lee
*Assistant Examiner*—Christle I Marshall
(74) *Attorney, Agent, or Firm*—Thomas, Kayden, Horstemeyer & Risley, LLP

(57) ABSTRACT

Various method and apparatus embodiments involving RFID switching are disclosed. One method embodiment, among others, includes receiving an excitation signal at a switch associated with a radio frequency identification (RFID) tag and a disabling material, and changing a state of the RFID tag with the switch based on proximity of the disabling material to the RFID tag.

33 Claims, 10 Drawing Sheets

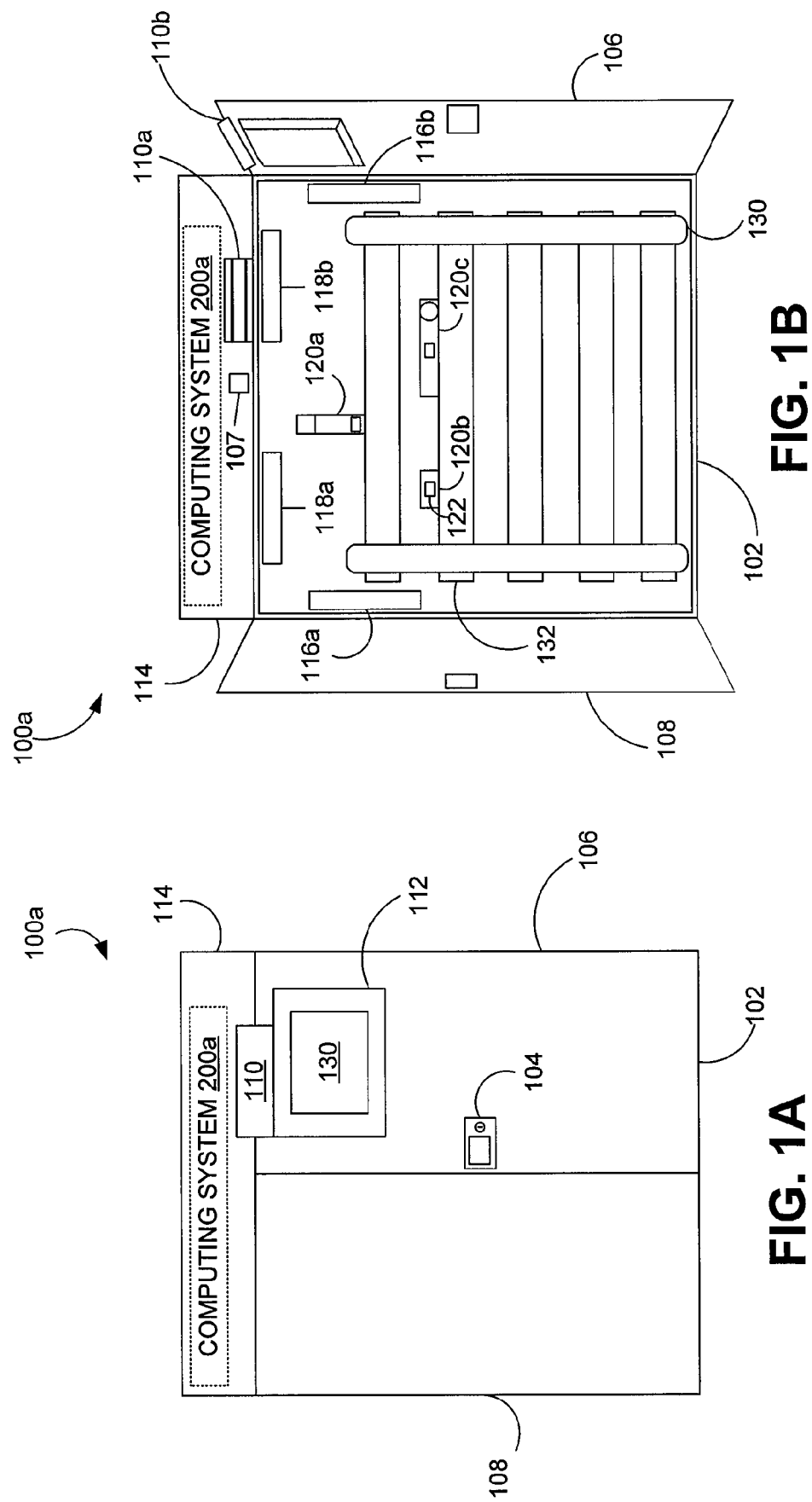

100d

```
┌─────────────────────────────────┐
│  SCAN AN INTERIOR SPACE OF AN   │ ── 902
│         ENCLOSURE, THE ENCLOSURE │
│     HAVING AT LEAST ONE RADIO   │
│      FREQUENCY IDENTIFICATION   │
│   (RFID) TAG AND AT LEAST ONE   │
│   OBJECT ASSOCIATED WITH THE    │
│        AT LEAST ONE RFID TAG    │
└─────────────────────────────────┘
                 │
                 ▼
┌─────────────────────────────────┐
│   RECEIVE AN INDICATION THAT A  │ ── 904
│   USER IS ATTEMPTING ACCESS TO  │
│         THE INTERIOR SPACE      │
└─────────────────────────────────┘
                 │
                 ▼
┌─────────────────────────────────┐
│  RESPONSIVE TO RECEIVING THE    │ ── 906
│   INDICATION, DETERMINE         │
│   WHETHER ACCESS TO THE         │
│  INTERIOR SPACE IS PERMITTED    │
│            BY THE USER          │
└─────────────────────────────────┘
```

FIG. 9

RFID SWITCHING

CROSS-REFERENCE TO RELATED APPLICATIONS

This application is a continuation-in-part of copending U.S. utility application entitled, "Portal System for Controlled Space," having Ser. No. 10/990,907, filed Nov. 17, 2004, which claims the benefit of U.S. provisional application having Ser. No. 60/565,089, filed Apr. 23, 2004, both of which are entirely incorporated herein by reference.

This application is related to copending U.S utility patent application entitled "Object Tracking in an Enclosure," filed on the same date and accorded Ser. No. 11/622,816, which is entirely incorporated herein by reference.

TECHNICAL FIELD

The present disclosure is generally related to monitoring and tracking objects, and more particularly, to systems, devices and methods for monitoring and tracking objects in an enclosure using radio frequency identification (RFID) technology.

BACKGROUND OF THE DISCLOSURE

Companies typically have difficulties tracking inventory items or objects and their usage within their facilities. Many inventory items are misused, misplaced, and improperly tracked and replenished by the employees of the companies. In some industries, misplaced items can lead to serious mishaps. For instance, in the aerospace industry, a wrench or other tool left behind in the maintenance or construction of an aircraft engine can result in the catastrophic failure of an engine valued at hundreds of thousands of dollars, or even worse if undetected before operation. Various safeguards have been established in the aerospace industry to prevent such mishaps, such as foreign object detection or FOD. FOD requires procedures that monitor the location of any object that can fall into (or otherwise be mistakenly left in) an aircraft or aircraft component. In a typical aerospace manufacturing environment, such procedures may result in one or more inspection personnel providing inspections of tool cabinets and tool drawers (herein, such tool cabinets and drawers collectively or individually referred to generally as enclosures). Shadowboxing may also be implemented in accord with such procedures. Shadowboxing refers to an outline of indirect material (e.g., objects such as wrenches, gauges, safety glasses, tools, pencils, etc.) in or on surfaces located within enclosures. The outline (or shadowbox) may be further distinguished from the surrounding surfaces by possessing a different color, different material, and/or different topology (e.g., such as a recess in a particular material). In some embodiments, other methods to provide distinction may be used (e.g., pegs or protrusions providing an outline of an object) alone or in combination with the aforementioned distinguishing features. When an object does not reside in the shadowbox, the outline provides an immediate visual indication to inspection personnel that the object is missing, and thus other procedures are invoked to track the missing object to prevent possible damage to equipment or harm to personnel. In a given manufacturing environment, the quantity of such enclosures that are to be checked one or more times throughout the day can consume a considerable amount of man-hours.

SUMMARY

The present disclosure provides various method and apparatus embodiments involving RFID switching.

One method embodiment, among others, includes receiving an excitation signal at a switch associated with a radio frequency identification (RFID) tag and a disabling material, and changing a state of the RFID tag with the switch based on proximity of the disabling material to the RFID tag.

Another method embodiment, among others, comprises sending an excitation signal to a switch associated with a radio frequency identification (RFID) tag and a disabling material, and receiving a response to the excitation signal based on a separation distance between the disabling material and the RFID tag, the separation distance based on a change in the switch.

One apparatus embodiment, among others, comprises a first member comprising a disabling material, a second member in moveable relationship with respect to the first member, and a multi-state radio frequency identification (RFID) tag coupled to the second member that changes state based on a separation distance between the RFID tag and the disabling material.

Other systems, devices, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed systems, devices, and methods. Moreover, in the drawings, like reference numerals designate corresponding parts throughout the several views.

FIGS. 1A-1B are elevation views that illustrate an embodiment of an object tracking system.

FIG. 9 is a flow diagram that illustrates an object tracking method embodiment corresponding to the object tracking systems shown in FIGS. 1A-3.

DETAILED DESCRIPTION OF THE DISCLOSURE

Figure 2A:
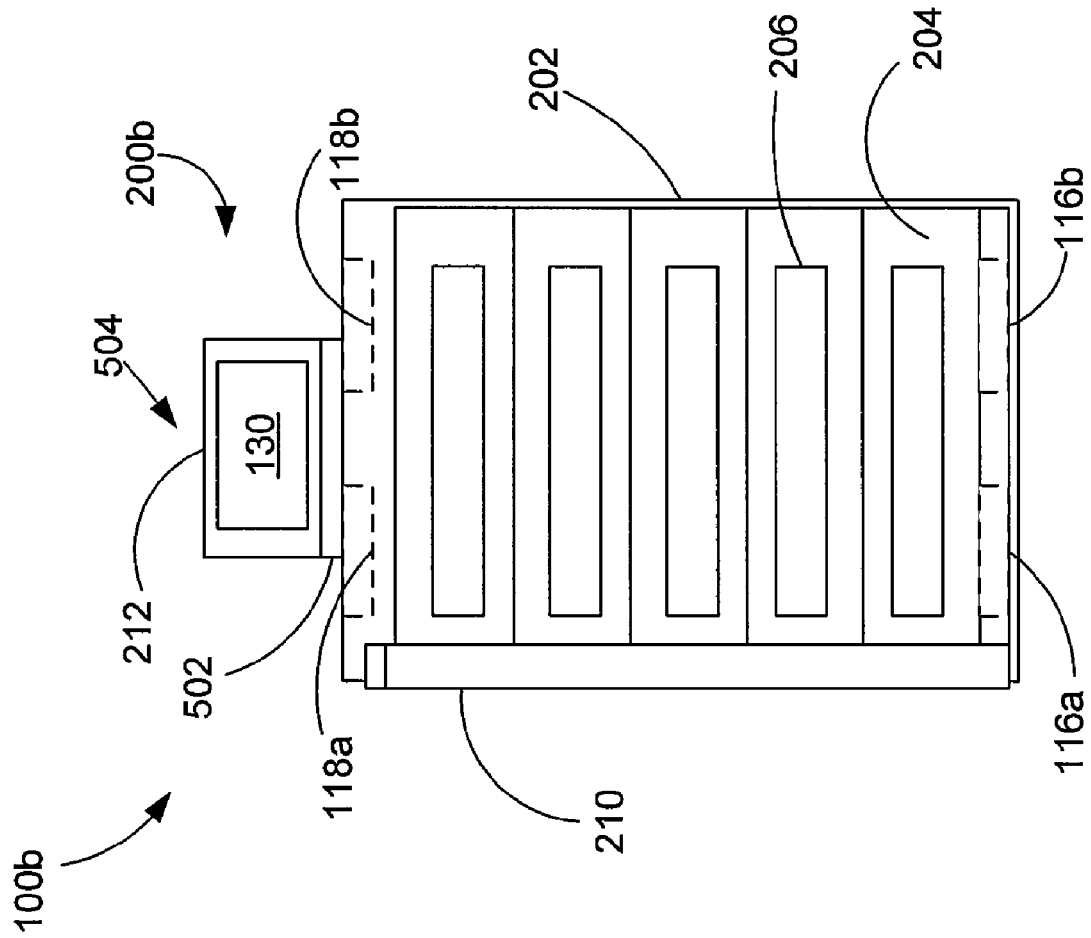
FIG. 2A is an elevation view that illustrates another embodiment of an object tracking system.

Disclosed herein are various embodiments of systems, devices, and methods that regulate access to objects in an enclosure, and monitor the entry of objects into, and removal of objects from, an enclosure using radio frequency identification (RFID) technology. Such systems, methods, and devices are herein referred to generally as object tracking systems.

A summary of various terms used herein is provided below, followed by a brief overview of one or more embodiments of an object tracking system and subsequently a more detailed description of these and other embodiments. RFID refers to technology that uses radio waves to automatically identify people or objects. An object refers to indirect material to be used in the support of operations of a facility, work environment, or the like, and includes pencils, tools, safety glasses, gauges, wrenches, etc.), as well as direct material (e.g., other inventory objects, such as files, jewelry, finished product, etc.). An object can be tagged and optionally shadowboxed and stored within an enclosure. An enclosure refers to an apparatus or environment that stores one or more objects, and which is configured to enable access to one or more objects through openings that are removably blocked by one or more access members (e.g., one or more cabinet doors, drawers, panels, etc.) that can be closed and opened. Examples of enclosures include drawer-type cabinets, cabinets with shelving, etc., or a combination of the same, or apparatuses having similar functionality.

Having described various terms used herein, a brief overview of one or more embodiments of an object tracking system is provided below. Certain embodiments of the object tracking systems comprise a computing system that provides authentication functionality, whereby access to one or more objects in an enclosure is permitted when a user seeking access is authenticated (e.g., confirmed that he or she is authorized to access the interior of the enclosure). For instance, in one embodiment, a user enters his or her identification information (e.g., by manual entry, through bar code or magnetic strip scanning, etc.) via an interface (e.g, touch-screen, graphical user interface (GUI), keypad entry interface, magnetic card reader, bar scanner, biometric scan, etc.). The computing system, in one embodiment through comparison of the received identification information with authorized user information in a database or other data structure, determines if the user is authorized to access the interior of the enclosure. Upon successful authentication, access to the interior of the enclosure by the user is enabled, as described further below.

With regard to object tracking functionality, each object stored in an enclosure is associated with a corresponding radio frequency identification (RFID) tag. In one embodiment, each object is associated with a switch, the switch having a tag affixed thereto. When the switch is loaded with the object, the tag possesses one state. When the object is removed from the enclosure, the tag possesses another state. Each state is treated differently by the computing system to enable the monitoring of when an object is removed and when an object is returned or otherwise inserted into the enclosure, as described below. In some embodiments, each RFID tag is attached to, or integrated into, each object in an enclosure. In some embodiments, a combination of these methods for associating RFID tags with objects may be used. The initial association of each RFID tag with a particular object can be implemented through a user interactive start-up or configuration procedure implemented at any point in time.

Detection and identification of an object occurs through an interaction of signal exchanges between RFID tags in an enclosure and the computing system. In one embodiment, an RFID tag stores an identifier on a microchip that is coupled to an antenna, the identifier associated (e.g., through the association process mentioned above) with an object in the enclosure. The microchip and the antenna comprise what is often referred to as an RFID transponder or RFID tag. The RFID tag is responsive to an excitation signal from the computing system, the latter which includes one or more readers, with each reader having receiver/transmitter (or transceiver) functionality as described further below. That is, in response to being activated or awakened by the excitation signal from the computing system (e.g., the reader of the computing system), the RFID tag transmits a response signal comprising the identification information to the reader. The reader converts the radio waves provided from the RFID tag into information that can be used to detect the presence or absence of an object associated with a particular RFID tag. The transmission of the identification information from the RFID tag may be implemented in some embodiments by generating an "original" signal (e.g., separate from and independent of the received excitation signal) in response to excitation by the signal from the reader. In some embodiments, the transmission may be implemented by reflecting back a portion of the excitation signal from the reader in a process referred to as backscatter. In some embodiments, a combination of both processes may occur. In other words, the RFID tags included within the scope of this disclosure include active, passive, or semi-passive tags, and in some embodiments, a combination of one or more of these types of RFID tags may be used in a given enclosure.

Having described generally the underlying functionality and architecture of certain embodiments of an object tracking system, one object tracking method embodiment can generally be described as follows. The computing system continually emits excitation signals to the interior of the enclosure in an effort to track which objects currently reside within the enclosure. Such emission of excitation signals to the interior for reception by the RFID tags, the receiving and reading of the information corresponding to the response signals from the RFID tags, and the determination as to which tags have been removed or returned (a hence which objects have been removed or returned) is also referred to herein as a scan, scanning, or a scanning process or the like. When a user seeks to access the interior space of the enclosure (e.g., to return an objet, or remove an object), the user enters identification information at an interface of the enclosure, which is received and processed by the computing system. If the user is not authorized to access the interior space of the enclosure, the user is denied access (e.g., the access member(s) removably blocking access to the interior of the enclosure remain locked). If the user is authorized, the computing system disengages a locking mechanism coupled to the access member (s) of an entrance or access point of the enclosure to enable access to the interior space of the enclosure, and the computing system in one embodiment temporarily ceases the scanning process. In one embodiment, the temporary cessation of the scan process occurs responsive to authentication (before disengagement of the locking mechanism). In some embodiments, the temporary cessation of the scan process can occur responsive to the disengagement of the locking mechanism, the opening of an access member, or a combination of two or more of the above described mechanisms in a redundant fashion (e.g., if the scan process does not cease after authentication, the disengagement and/or the opening of the access member acts as a fails-safe mechanism to ensure the scanning process ceases).

Assume the user removes a tool. Such removal of the tool either removes the associated RFID tag (assuming coupling or integration of the RFID tag with or within the tool), or the removal of the tool changes the status or state of an RFID tag, for instance by closing of a metallic switch upon the RFID tag to disable the ability of the computing system to properly read the RFID tag. When the user closes the access member (e.g., cabinet door), a sensor senses that the access member is closed and communicates (e.g., by actively sending or via polling mechanisms implemented by the computing system) this change in access member status to the computing system, which responsively resumes the scan process. In some embodiments, the re-engagement (automatic upon closure, or in some embodiments, controlled by the computing system responsive to receipt of status of door opening from the sensor) of the locking mechanism is sensed or otherwise communicated to the computing system, and the computing system resumes the scanning process responsive to re-engagement. Through the resumption of the scanning process, the computing system determines that an object listed in its corresponding database is not detected during the scanning process (e.g., either because the tag is physically removed from the enclosure or the tag status has changed to a non-readable state in a switch embodiment). Thus, from the signals received from the RFID tags, the computing system (e.g., software in the computing system) updates the count of the objects associated with the enclosure and continually updates the accuracy of such a count. Additionally, the computing system provides feedback of that missing tool to a user, operator, or other device (e.g., networked computer used by a tool manager or quality assurance personnel responsible for monitoring tool inventory and/or compliance with safety protocols among one or more enclosures). Such feedback may be implemented via one or more of a local and/or remote screen display, warning lights, sound, among other mechanisms described below.

Having described various system and method embodiments, what follows is a further description of these and other embodiments in the context of an object tracking system for authorized access and tracking of indirect materials, with the understanding that other implementations (e.g., for use with direct materials in the same or other environments) will similarly benefit from the disclosed principles of operation. Referring now to FIGS. 1A and 1B, shown is one embodiment of an object tracking system 100a that comprises an enclosure 102 embodied as a cabinet, and a cap 114 that rests on top of, or is otherwise integrated with, the enclosure 102. In some embodiments, the cap 114 can be located elsewhere, such as on the side of the enclosure 102, below the enclosure 102, or remotely from the enclosure 102. The enclosure 102 comprises an access mechanism 104 from which a user gains access to the interior of the enclosure 102. The access mechanism 104 may comprise a handle, knob, latch, or other suitable mechanism for permitting entry by a user into the interior of the enclosure 102.

The enclosure 102 further comprises two access members also referred to herein as locking doors 106 and 108 that, upon authorized (e.g., authenticated) entry, a user may swing open to gain access to objects within. In one embodiment, locking door 106 is opened first before locking door 108 can be opened. The enclosure 102 also includes a sensor 107 (e.g., electromechanical sensor, photo-diode, etc.) configured to detect when the locking door 108 is closed. One having ordinary skill in the art can understand in the context of this disclosure that the location or type of sensor 107 can vary, and in some embodiments, can be integrated within other components, such as within access mechanism 104 or electro-magnetic lock 110. Further, sensor 107 can actively communicate the status (e.g., of door closing) to the computing system 200a, or in some embodiments, can be polled by the computing system 200a, among other mechanisms including a combination of the mechanisms described above or other mechanisms for detecting and communicating the status. In some embodiments, each locking door 106 and 108 may be configured with an access mechanism 104 to enable independent entry of separate (or shared) interior spaces within enclosure 102. Although illustrated (e.g., FIG. 1B) as using a hinge mechanism to open and close the locking doors 106 and 108, in some embodiments the locking doors can be replaced with other suitable access member(s), such as lockable sliding doors (e.g., on a rail, etc.), roll-up single door, similar to a garage door, among others.

In one embodiment, access is permitted or denied through use of an electro-magnetic lock 110, which is fixedly coupled to the enclosure 102. In some embodiments, mechanisms other than, or in addition to, electro-magnetic operation may be employed, such as electromotive forces, mechanical locks, among other well-known mechanisms to enable controlled opening and locking of locking doors 106 and 108. The electro-magnetic lock 110 comprises a first portion 110b coupled to the locking door 106 and a second portion 110a coupled to the cap 114 of the enclosure 102. Though shown located towards the top of the enclosure 102, it is noted that the electro-magnetic lock 110 can be coupled anywhere on the enclosure 102 so long as the electro-magnetic lock 110 engages and disengages the locking door 106 in a manner that controllably permits or denies access to the interior of the enclosure 102.

The electro-magnetic lock 110, when energized by the computing system 200a (e.g., via self-contained power in one embodiment, or in some embodiments, when power is supplied remotely and switched by the computing system 200a), denies entry by prohibiting the locking door 106 (and hence, in one embodiment by virtue of overlapping doors, locking door 108) from being opened. When de-energized, the electro-magnetic lock 110 permits opening of the locking door 106. Upon closure of the doors 106 and 108, the electro-magnetic lock 110 automatically re-engages and the sensor 107 senses the closure and communicates (e.g., actively or passively) the status to the computing system 200a to subsequently enable resumption of the scanning process. As explained above, in some embodiments, the re-engagement of electro-magnetic lock 110 is communicated to (or otherwise sensed by, such as through the use of a current sensor) the computing system 200a, which responsively resumes the scan process. In some embodiments, the electro-magnetic lock 110 is re-engaged in response to control signals from the computing system 200a (e.g., the latter prompted in response to receiving the status of door closing from the sensor 107). As the operation of electro-magnetic locks is well-known, further description is omitted here for brevity. Although described in the context of manual opening and closing of the locking doors 106, 108, it can be understood by those having ordinary skill in the art that automatic opening and/or closing of the doors may be implemented in some embodiments.

The cap 114 is located, in one embodiment, at the top of the enclosure 102. The cap 114 houses a computing system 200a, which is symbolically represented in phantom with a dashed box. The computing system 200a controls the authentication process used to enable entry or denial of access to the interior of the enclosure 102, while also providing scanning functionality, among other functions. One having ordinary skill in the art can appreciate that the location of the cap 114 (and hence computing system 200a) may be elsewhere, for instance at the side of the enclosure 102 or located remotely.

Also coupled to the enclosure 102 is a user interface 112, which in one embodiment comprises a graphics user interface (GUI) 130. The GUI 130 may use light-emitting diode (LED), liquid-crystal diode (LCD), or plasma technology, among others. The GUI 130 comprises a touch-screen that enables a user to enter a password and/or user identification by selecting his or her name on the screen and/or entering via alphanumeric button icons. In some embodiments, the user interface 112 may include authentication procedures used in lieu of or in addition to the touch-screen GUI 130, including one or more of the following: a biometric scanner, bar code reader (e.g., for use with scannable employee identification tags comprising bar codes), magnetic card reader, electro-magnetic pushbuttons in cooperation with a display or without a display, key entry, among other mechanisms.

Continuing with reference to FIG. 1B, FIG. 1B shows the enclosure 102 after the locking doors 106 and 108 have been opened by an authenticated user. The interior space of the enclosure 102 comprises four transmit/receive (T/R) antennas 116a, 116b, 118a, and 118b associated with one or more readers (not shown). In one embodiment, two of the T/R antennas 116a, 116b are attached to opposing ends of the interior sides of the enclosure 102, and two of the T/R antennas 118a, 118b are attached to the interior top portion of the enclosure 102. One having ordinary skill in the art would understand that fewer or greater numbers of antennas may be used in different locations and/or different configurations (e.g., different configurations such as separate transmit and receive antennas for each reader, among others). For instance, depending on many factors including the size of the enclosure, density of internal structures, material of internal structures located within an enclosure, quantity of objects, a single T/R antenna may be used with one reader.

Included within the enclosure 102 is a shelving structure 130, which comprises one or more shelves 132. The shelving structure 130 may be configured in a variety of ways, such as with easily removable shelves 132 (e.g., snap-on versus fixably attached as with screws or bolts or other fasteners), slidable shelves that are extended and retracted using a rail assembly or other mechanism), fixably attached shelves, or a combination of these or others structures. In one embodiment, the entirety of the shelving structure 130 is comprised of a non-metallic material (e.g., plexiglass, plastic, etc.), with shelves 132 comprising a honeycomb (or other noncontiguous-type surface) surface on which objects are placed. One having ordinary skill in the art would understand that other configurations may be used, including solid shelves 132 (versus honey-combed), mixed material (e.g., substantially non-metallic shelves in combination with metallic material, two or more different non-metallic materials, etc.). Further, the surfaces of the shelves 132 may include shadow-boxing or other mechanisms to aid in distinguishing when objects are removed.

Located on one or more of the shelves 132 may be one or more objects, such as objects 120a-120c. For instance, object 120a may comprise a can of spray paint, object 120b may comprise a tape measure, and object 120c may comprise a hammer. In one embodiment, each of the objects 120a-120c includes an RFID tag 122 (herein, also tag(s) 122) affixed thereto. In some embodiments, the tags 122 may be integrated into each object 120a-120c. In some embodiments, the tags 122 may be affixed to switches (not shown) on which the objects 120a-120c rest, as explained further below.

In operation, when the locking doors 106 and 108 are closed, the electro-magnetic lock 110 engages, and the closed-door (or re-engagement in some embodiments) status is sensed or received by the computing system 200a, enabling the computing system 200a to resume the scanning process. That is, the computing system 200a generates excitation signals (e.g., RF, though not limited to the defined radio frequency band as commonly defined in communications systems) that are emitted from T/R antennas 116a, 116b and 118a, 118b. These RF signals are dispersed throughout the enclosure 102 and impinge on the tags 122 as part of the scanning process. Transmitted signals (including reflected signals) sent by the tags 122 in response to the excitation signals are received at the T/R antennas 116a, 116b and 118a, 118, and processed (e.g., demodulated, decoded, etc.) by receiver electronics in a reader in known manner within the computing system 200a. The computing system 200a uses the processed data to identify objects present and missing from the enclosure, which is also part of the scanning process. That is, the signals received from the tags 122 are read by the computing system 200a to determine the quantity of tags 122 currently located within the enclosure 102, from which a determination is made as to which tags are missing. The frequency of the scanning process is configurable, and in one embodiment, may occur at a rate of every 0.75 seconds while the doors 106 and 108 are closed and locked.

A user attempting to gain access to the interior of the enclosure (e.g., to return an object 120a or retrieve an object 120b) undergoes an authentication process. In one embodiment, the user enters his or her name, and/or other identification, as explained above at the user interface 112 (e.g., at the GUI 130). If the user is authenticated (e.g., the object tracking system 100a confirms that this is a user that is authorized to access the interior of the enclosure 102), the computing system 200a ceases the scan process and de-energizes the electro-magnetic lock 110, after which the authenticated user is able to open the locking door 106 (and if needed, locking door 108). Subsequently, the user either returns or retrieves one or more objects.

When the user closes the doors 106, 108, the doors 106, 108 in one embodiment are automatically locked via the electro-magnetic lock 110, the closed-door in one embodiment is sensed by sensor 107, the status of which is communicated to the computing system 200a, resulting in the computing system 200a resuming the scanning process, which include the reading of tags 122 as explained above. By performing the reading of the tags 122 and comparing the inventory of tags 122 before and after the authenticated access, the computing system 200a is able to determine what has been removed or added and provide an update through display of the status on the GUI 130 and/or elsewhere. For instance, the computing system 200a renders the results on the GUI 130, which in one embodiment continuously displays an update of the status of objects associated with (e.g., objects removed and returned) the enclosure 102 by displaying which objects have been added or removed and the number of objects added to or removed from the enclosure 102.

In some embodiments, additional information displayed by the GUI 130 or displayed or provided elsewhere may include the name and/or identification number of the user, the department to which the user is associated, among other information through cooperation with a data structure located in, or in communication with, the computing system 200a. In some embodiments, the update of the status can be in the form of an audio (e.g., verbal or periodic sound) update in addition to or in lieu of the visual update. The scanning process continues until interrupted by the next authenticated access to the interior of the enclosure 102.

FIG. 2A illustrates another embodiment of an object tracking system 100b. Similar scanning principles as described for the object tracking system 100a apply in this embodiment 100b as well, with differences described below. As shown, the object tracking system 100b comprises an enclosure 202 embodied as a drawer-type cabinet comprising one or more access members, also referred to herein individually or collectively as drawers 204, that slidably move in and out of the enclosure (e.g., on rails). Each of the drawers comprises a handle 206 that facilitates the opening of each drawer. Similar to that mentioned above, the opening and/or closing of each of the drawers 204 may be automated in some embodiments. The enclosure 202 also includes, without limitation, a sensor (not shown, but similar to sensor 107, positioned to detect the drawer closing and/or opening) and an electro-magnetic lock 210 that operates similarly to the electro-magnetic lock 110 shown in FIGS. 1A-1B. The electro-magnetic lock 210 is embodied as a spring-loaded hinge assembly that swivels open when de-energized. When energized, the electro-magnetic lock 210 prevents opening of the drawers 204 (e.g., by blocking the drawers 204). In some embodiments, the lock 210 may be alternately configured, such that de-energizing the lock 210 results in the denial of entry.

The enclosure 202 further comprises T/R antennas 116a, 116b, and 118a, 118b associated with one or more readers (not shown) arranged in a different configuration than those shown in FIG. 1B. In one embodiment, the T/R antennas 116a and 116b are located at the interior bottom of the enclosure 202 and the T/R antennas 118a and 118b are attached to the interior top of the enclosure 202. Similar in manner to that mentioned above with regard to the quantity and configuration of T/R antennas 116a, 116b, 118a, 118b shown in FIG. 1B, one having ordinary skill in the art would understand that fewer or greater numbers of T/R antennas, in the same or different configuration may be used in some embodiments, including the use of a single T/R antenna.

The object tracking system 100b further comprises a computing system 200b, which includes a computing device 502 coupled to a transceiver control 504 (obscured from view). The computing device 502 further comprises a display 212 and processing hardware and software. The display 212 comprises a GUI 130 acting alone or in combination with a keyboard (not shown) or other user entry mechanism as described above to serve as a user interface, in similar manner to that described in FIGS. 1A-1B.

Figure 2B:
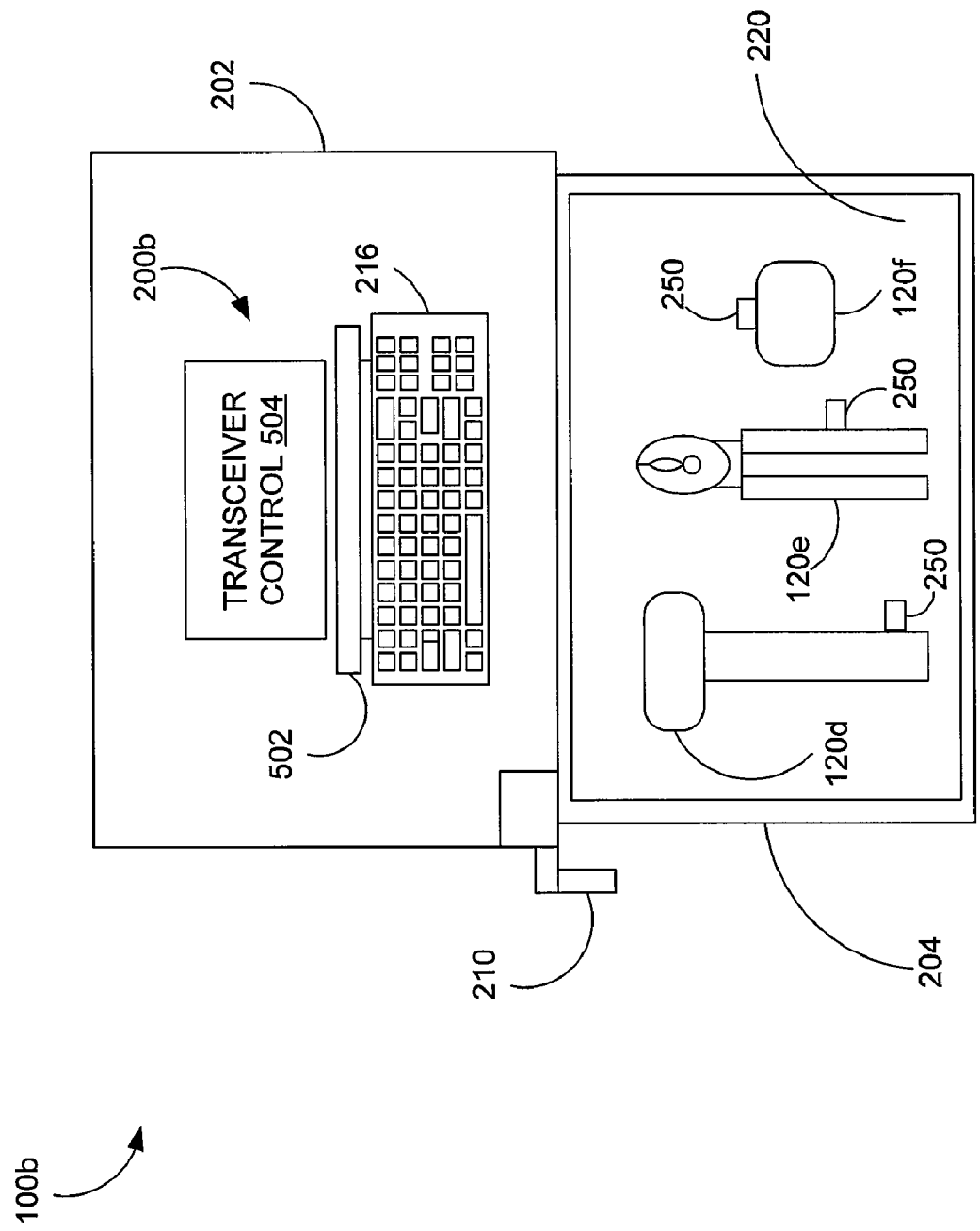
FIG. 2B is a plan view of the object tracking system shown in FIG. 2A with an enclosure shown having an opened drawer.

Referring to FIG. 2B, a top-plan view of the object tracking system 100b is shown, with one of the drawers 204 extended open. The computing system 200b comprises the transceiver control 504 (also referred to herein as transceiver control logic), as mentioned above, as well as a keyboard 216 associated with the computing device 502. The transceiver control 504 and at least portions of the computing device 502 collectively provide functionality of a reader. Various examples in the industry of reader technology can be used, including those found in U.S. Pat. Nos. 4,730,188 and 5,541,574, herein incorporated by reference in their entirety, and hence further discussion of the same is omitted for brevity. One having ordinary skill in the art can appreciate that, though shown as separate components, a reader may be used in some embodiments that can be embodied as a single device with or without an integrated display, among other configurations.

As shown, the electro-magnetic lock 210 is in the swivel-open position via the computing system 200a de-energizing the lock 210 in response to authenticating a user (and hence providing access to the interior of the enclosure 202). In the swivel-open position, a user is able to freely pull the drawer 204 (and other drawers) open. The drawer 204 is shown with several objects 120d-120f (e.g., hammer, pliers, tape measure, respectively) resting on a surface 220. The surface 220 comprises a mostly non-metallic surface, such as plastic, plexiglass, among other materials, which enables passage of the RF signals provided using the T/R antennas 116a, 116b, 118a, 118b through several drawers 204. In one embodiment, the surface 220 can be solid, while in some embodiments, the surface 220 may be of a honey-comb surface or the like, or a combination of both in some embodiments (as is true for the variety of surfaces that can be used for the shelves 132, FIG. 1B). In one embodiment, the surface is configured with one or more shadowboxes (obscured from view by the objects) in which each object 120d-120f rests.

In one embodiment, each of the objects 120d-120f rests on a member (hidden from view) of a corresponding switch 250 (described in association with FIGS. 4A-4B), whereby each switch 250 includes a tag 122 (obscured from view). For instance, the weight of the object 120d-120f causes the switch 250 to open, resulting in the ability of a signal reflected from (or transmitted by) the tag 122 to be read by the computing system 200b, which the computing system 200b interprets as indicating a presence of the particular object in the enclosure 202. In contrast, the removal of the object 120d-120f from a member of the switch results in the closure of the switch 250, resulting in cancellation of the signal (e.g., via a metallic surface of the switch 250 coming in contact with the tag 122), which, the computing system 200b interprets as an object missing from the enclosure 204.

Although such a switch configuration can be referred to in electronics parlance as a normally closed (n.c.) state (where two members of the switch 250, one having the tag 122, are in contact when unloaded), normally open (n.o.) configurations can be used whereby the state of the switch is interpreted differently by the computing system 200b. Further explanation of various embodiments of the switches 250 follows below in association with FIGS. 4A-4B. Additionally, one having ordinary skill in the art can recognize within the context of this disclosure that tags 122 may be attached to, or integrated with, the objects in addition to or in lieu of using the switches 250 in some embodiments.

The operation of the object tracking system 100b is similar to that described for the object tracking system 100a. That is, the computing system 200b implements a scanning operation continuously until authentication (or in some embodiments, responsive to opening of the drawer 204 and/or disengagement of electro-magnetic lock 210), enabling the monitoring of inventory of objects 120d-120f in the drawer 204. To gain access to the interior of the enclosure 202 (e.g., to access one or more of objects 120d-120f in at least one of the drawers 204), a user is authenticated through the GUI 130 and/or keyboard 216 (e.g., manual entry, or in some embodiments, a separate device may be used to enable the scanning of an ID code or the like as described above). Once authenticated, the computing system 200b de-energizes the electro-magnetic lock 210, the lock swivels open, and the user is able to now gain access to contents in the drawer 204. Also, at a time corresponding to authentication, the computing system 200 ceases the scanning process. In some embodiments, the cessation of the scanning process can be responsive to opening the drawer 204 and/or responsive to unlocking the door (as opposed to opening of the door).

Once the user has completed access to one or more of the drawers 204, the user closes the drawers, the drawers are automatically locked via the electro-magnetic lock 210, and the closure (and/or locking in some embodiments) is sensed and communicated to the computing system 200b. The computing system 200b then resumes the scanning process to identify what objects have been removed from or returned to the drawer 204, and provides an updated count (status update) of those objects on the GUI 130 (and/or remotely to other personnel or devices). The status update may be visual, audible, or a combination of both.

Figure 3:
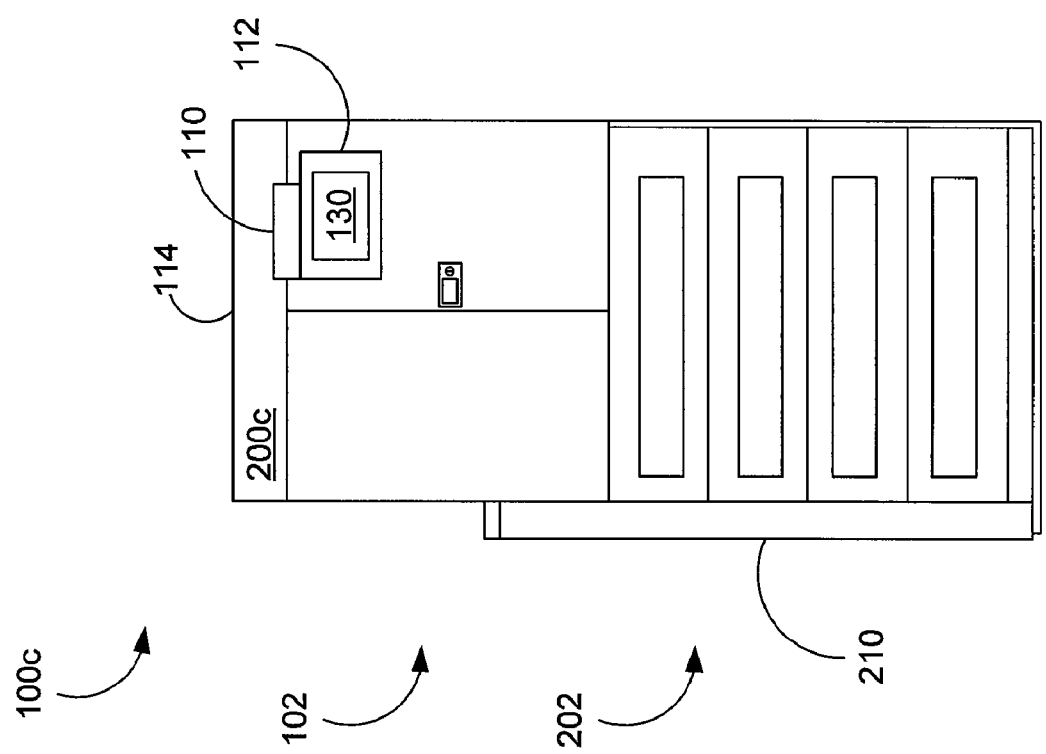
FIG. 3 is an elevation view of another embodiment of an object tracking system that combines features of the object tracking system embodiments shown in FIGS. 1A-2B.

FIG. 3 is another embodiment of an object tracking system 100c. Operation is similar to that described above for the object tracking systems 100a and 100b. As shown, the object tracking system 100c comprises a combination of the enclosures 102 and 202, with the enclosure 102 stacked upon the enclosure 202, although in some embodiments, the relative location of enclosures 102 and 202 can be reversed. The computing system 200c is shown included in cap 114, and provides the operational functionality for the entire assembly, including authentication, the energizing/de-energizing of the electro-magnetic locks 110 and 210 for the respective enclosure 102 and 202, and scanning functionality. In one embodiment, the enclosures 102 and 202 are separated by a metal divider (not shown) disposed between the two enclosures 102 and 202. In some embodiments, authentication for each enclosure 102 and 202 may be implemented separately.

The T/R antennas (not shown) may be positioned in similar manner in the enclosure 102 as shown in FIG. 1B. The T/R antennas (not shown) for the enclosure 202 may all be located at the interior bottom of the enclosure 202. Other T/R antenna configurations can be used, as explained above. The user interface 112 includes a GUI 130, and serves to provide, in cooperation with the computing system 200c, authentication functionality for both enclosures 102 and 202. Scanning may occur independently for the respective enclosure 102 and 202, or performed as a single entity. That is, considering an embodiment whereby the scan process is dependent on door opening and closing, upon opening a drawer 204, the scanning process may cease for the enclosure 202, but continue for the enclosure 102 (i.e., is independent), assuming locking doors 106 or 108 are not open. Alternatively, in some embodiments, the opening of either locking doors 106, 108 or drawers 204 results in a cessation of the scanning process (i.e., treated as a single entity) for the entire system. In some embodiments, the choice to operate in independent fashion or otherwise may be configurable by the user.

Figure 4A:
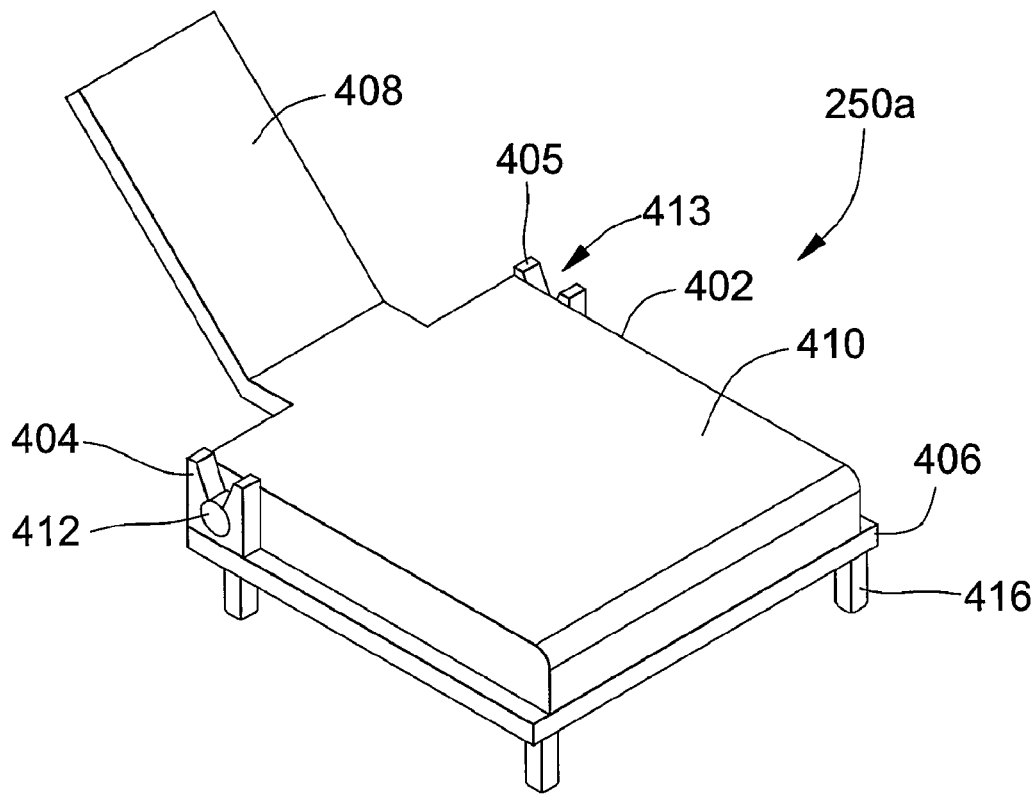
FIGS. 4A-4B are schematic diagrams that show one embodiment of a radio frequency identification (RFID) switch that can be used in cooperation with the object tracking systems shown in FIGS. 1A-3
Figure 4B:
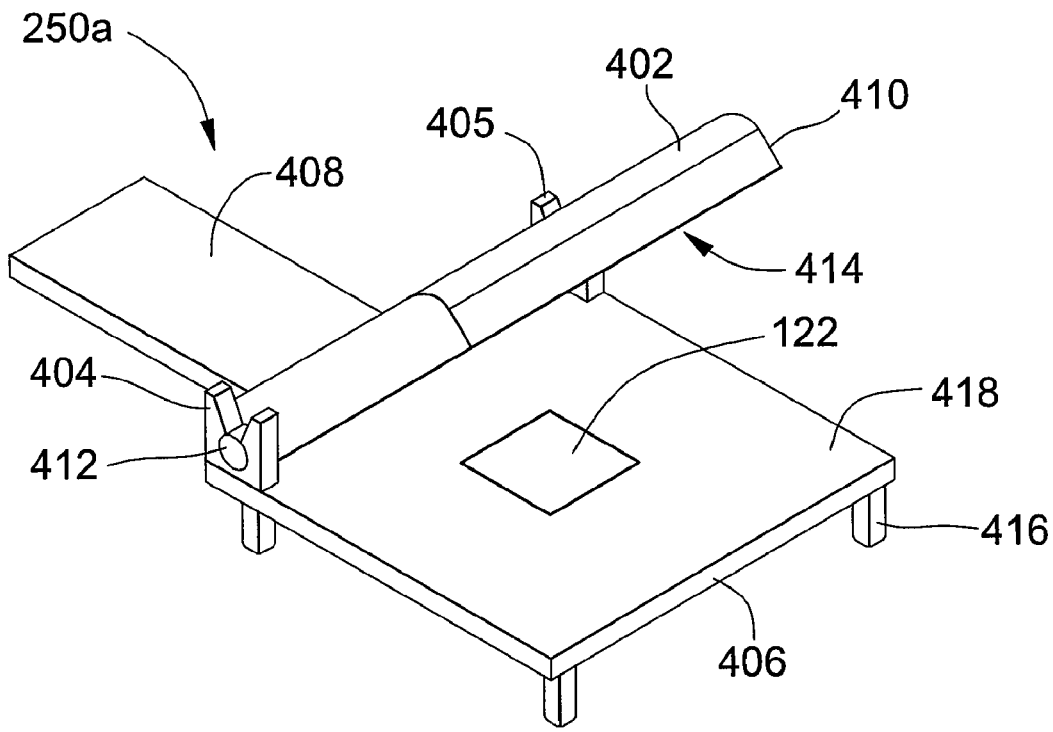

FIGS. 4A and 4B are schematic diagrams that illustrate one embodiment of a switch 250a (also referred to herein as an RFID switch), configured as a rocker-type switch. The RFID switch 250a comprises a first portion 402 hingably coupled at slotted connecting members 404 and 405 attached to (or molded with) a second portion 406. The first portion 402 comprises a first member 408 in angular relation to a second member 410. In one embodiment, the angle formed between the first member 408 and the second member 410 is approximately 135 degrees, though other angular dimensions may be used in some embodiments. The second member 410 also comprises two stubs 412 and 413, each projecting away and within the plane of the second member 410. The two stubs 412 and 413 are in hingable relationship to the slotted connecting members 404 and 405, respectively, enabling first member 408 to rotate from an approximately 45 degree angle (unloaded position) with respect to a planar surface (e.g., surface 220 of drawer 204) on which the switch 250a rests, to a position whereby the first member 408 comes to loaded rest on the surface or slightly above the surface, the loaded ending position depending on the object geometry. The weight of the second member 410 is greater than the unloaded weight of the first member 408. Thus, when an object is removed from the first member 408, the first member automatically rotates back to the angled position of approximately 45 degrees with respect to the planar surface. In some embodiments, the bias provided by the difference in weight can be replaced with a spring or other biasing mechanisms.

The second member 410 also comprises a first surface 414 that, when the switch 250a is unloaded (no object placed on the first member 408), lies adjacent to a second surface 418 of the second portion 406. The first surface 414 comprises, in a defined area located approximately centrally on the first surface 414, a material (herein, disabling material) that cancels or otherwise disables signals surrounding the tag 122 located on the second surface 418, thus disabling any ability to read the tag at the computing system 200a, 200b, or 200c. In one embodiment, the disabling material may be integrated into the first surface 414. In some embodiments, the disabling material may be affixed to the first surface 414, directly or through an intermediary material. The disabling material may be comprised of a metallic material, including aluminum foil, and may comprise an area substantially equal to the area of the tag 122, or may be configured as an outline trace of approximately equal length of each side-edge of a tag 122. In some embodiments, the disabling material may comprise a fluid, such as water, that is enclosed in a plastic package affixed to the first surface 414, or integrated within the first surface 414 in some embodiments. Any disabling material may be used that cancels the surrounding signals of the tag 122 or otherwise renders the signals surrounding the tag 122 ineffective for purposes of reading the response signals.

As mentioned above, the second portion 406 comprises the second surface 418, upon which (or integrated within) a tag 122 is located. Though shown located centrally on the second surface 418 and encompassing an area as shown that is substantially smaller than the area of the second surface 418, it can be appreciated that the tag 122 can be located elsewhere on the second surface 418 (and hence the disabling material on the first surface 414 is likewise positioned such that when the switch 250a is unloaded, the disabling material is substantially coincident with the location of the tag 122). Further, the tag 122 may have different relative dimensions with respect to the second surface 418 than that shown in FIG. 4B. The second portion 406 also comprises four legs 414 that rest on the planar surface of the drawer or shelf of the enclosure. In some embodiments, the legs 414 can be configured with an adhesive that stick to the planar surface of the drawer or shelf, or comprise sharpened or pointed bottom surfaces that puncture the planar surface, enabling resistance to movement when placed on the planar surface. Other mechanisms for resisting movement may be used, as can be appreciated by one having ordinary skill in the art.

In one embodiment, the switch 250a is comprised of a substantially non-metal material (e.g., plastic, rubber, wood, graphite, etc.), with at least a portion of the first surface 414 (the area where the disabling material is positioned) comprised of a metallic material or other material that causes an inability (by the computing system 200a, 200b, 200c, hereinafter using 200b in the discussion of FIGS. 4A-4B for purposes of brevity) to read the tag 122. By providing the disabling material at, or affixed to, the first surface 414, the state of each tag 122 can be altered (and hence determined and/or controlled) based on the position of the switch 250a, hence assisting in the determination of whether an object is present in an enclosure or not.

In some embodiments, actual contact between the tag 122 and the disabling material need not be made to cause an inability to read the tag 122, depending on the size of the tag 122, the strength and angle of incidence of the excitation signal, environmental influences (e.g., interference) within an enclosure, among other factors. For instance, in one embodiment without limitation, where the "footprint" of the switch 250a is approximately the size of a dime, the separation distance between the tag 122 and the disabling material may be approximately up to 0.125 inches to disable the tag 122, depending on the surrounding environment, angle of incidence, among other factors.

Summarizing the operation of the switch 250a, an object placed on the first member 408 (not shown) causes the first member 408 to rotate in the direction of the gravitational force resulting from the weight of the object due in part to the rotational movement enabled by the connecting members 412 and 413. This rotation results in a separation between the first surface 414 comprising the disabling material and the second surface 418 comprising the tag 122, hence exposing the tag 122 to excitation signals delivered from the computing system 200b as well as enabling the transmission (including reflection) of response signals by the tag 122 back to the computing system 200b to enable read functionality. Hence, when loaded by an object, the switch 250a movement causes the tag 122 to possess a first state that allows for reading of the tag 122 (e.g., the computing system 200b can determine that the object is present in the enclosure).

When the object is removed from the first member 408, the unloading of the object causes a "rocker" motion whereby the first member 408 returns to the unloaded position and the second member 410, connected to the first member 408, returns to rest upon the second portion 406. By returning to this resting or unloaded position, the tag 122 is in contact with the disabling material residing on the first surface 414, which renders any attempt at reading the tag 122 ineffective. Thus, the unloading of the switch 250a commences a second state for the tag 122, whereby the tag 122 cannot be read by the computing system 200b (e.g., due to cancellation or otherwise of signals due to proximity of the tag 122 to the disabling material). In the second state, the computing system 200b can determine that the object is missing, for instance by comparison to an expected object inventory or object count.

It can be appreciated by one having ordinary skill in the art, in the context of this disclosure, that other switching mechanisms (e.g., spring-loaded switches, mercury-type switches, etc.) may be employed in a manner whereby loading and unloading by an object responsively changes the proximity of a tag 122 to a disabling material, and hence changes the state of the tag 122 for purposes of detection by the computing system 200a, 200b, or 200c.

Referring now to an embodiment of computing system 200 (which comprises functionality of embodiments 200a, 200b, and/or 200c) shown in FIG. 5, the computing system 200 comprises the computing device 502 that is electrically coupled to and controls user interface 112 (or user interface 212, the latter omitted from discussion hereinafter for brevity), electro-magnetic lock 110 (or 210, the latter omitted from discussion hereinafter for brevity), and sensor 107. The computing device 502 is also coupled to transceiver control 504, which comprises well-known transmitter and receiver functionality that is electrically coupled to one or more antennas, such as T/R antennas 116a, 116b, 118a, 118b. In one embodiment, the transceiver control 504 wirelessly receives and processes (e.g., demodulates, decodes, etc.) signals from tags 122 that are attached to or integrated with objects (or attached to or integrated with switches associated with the objects) located within an enclosure (e.g., enclosure 102, 202, etc.). The transceiver control 504 and portions of the computing device 502 comprise a reader 506, which in one embodiment, collectively performs the scanning processes described herein. Although shown as separate modules, the functionality of the transceiver control 506 and reading and control functionality (e.g., software, firmware, etc.) of the computing device 502 can be integrated into a single device, such as an applications specific integrated circuit (ASIC) or other processing device. The computing device 502 receives the information corresponding to the received radio frequency signals (e.g., decoded data) from the transceiver control 504, and tracks and monitors the inventory of objects within an enclosure.

The computing device 502 is further configured to control power through cooperation with power source 508 to electromagnetic locks 110, which through user interface devices 606 (FIG. 6) effectuates the locking or unlocking of the locking doors 106, 108 or drawers (e.g., 204) based on data entered by a user through the user interface 112. That is, the computing device 502 is used to determine, based on information obtained via user interface 112, whether a user is authorized to access the interior of the enclosure (e.g., enclosures 102, 202), and then controls access to the enclosure. In some embodiments, the power source 508 can be located remotely from the computing system 200. The sensor 107 communicates status of door closing and/or opening to the computing device 502, such as via polling mechanisms employed by the computing device 502 or through active transmission of status information to the computing device 502.

In some embodiments, the computing system 200 can be communicatively coupled to a remote computing device 512 via a network 510 so that the object tracking system 100a-100c can communicate with the remote computing device 512. The remote computing device 512 can transmit new or updated user information, cost account information, security information, replenishment information, and inventory information to the computing system 200. The computing system 200 can transmit monitored and tracked information to the remote computing device 512, enabling the information or object inventory information to be stored and/or monitored at a second location.

Figure 5:
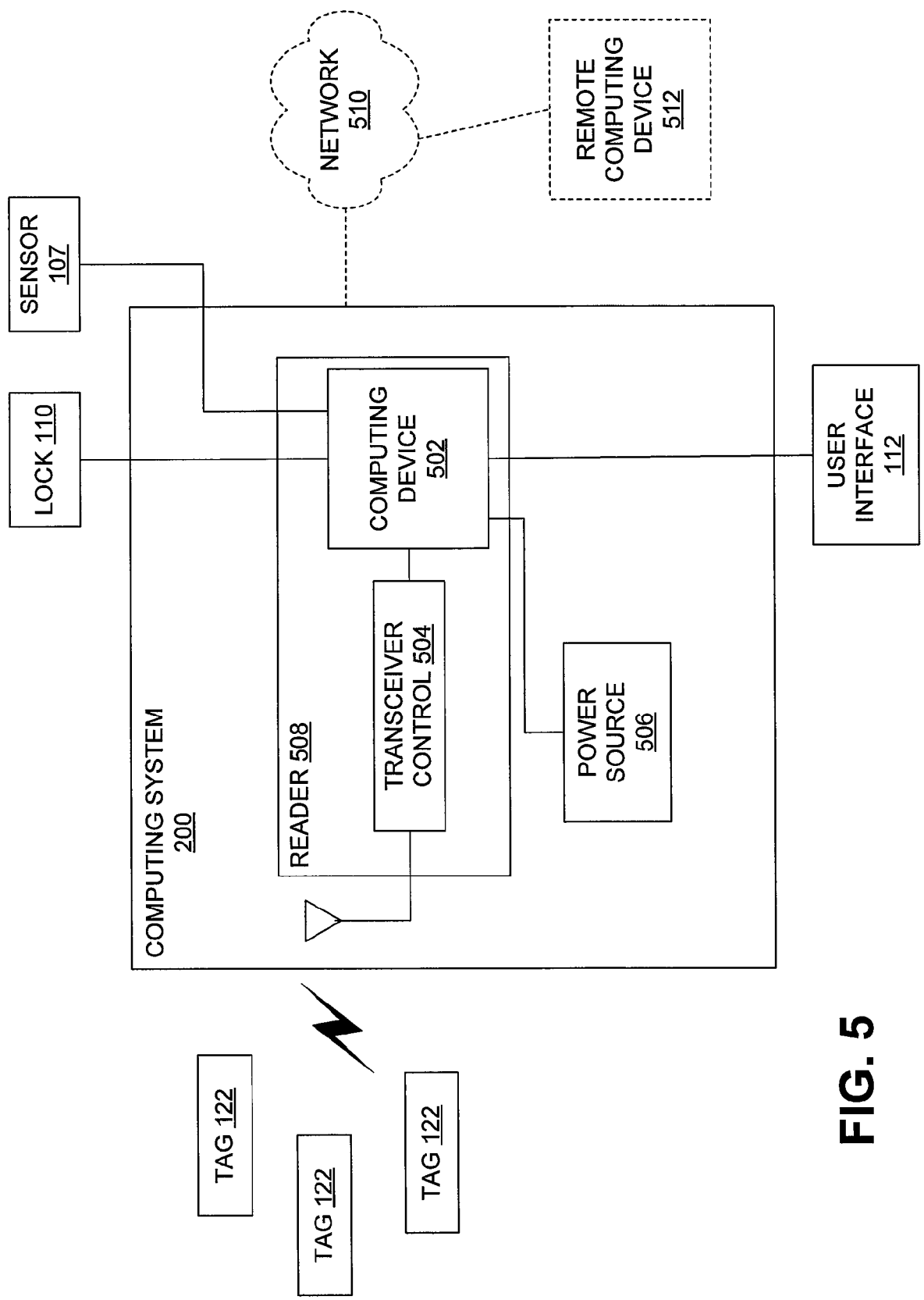
FIGS. 5-6 are block diagrams of embodiments of a computing system and components therein of the object tracking systems shown in FIGS. 1A-3.
Figure 6:
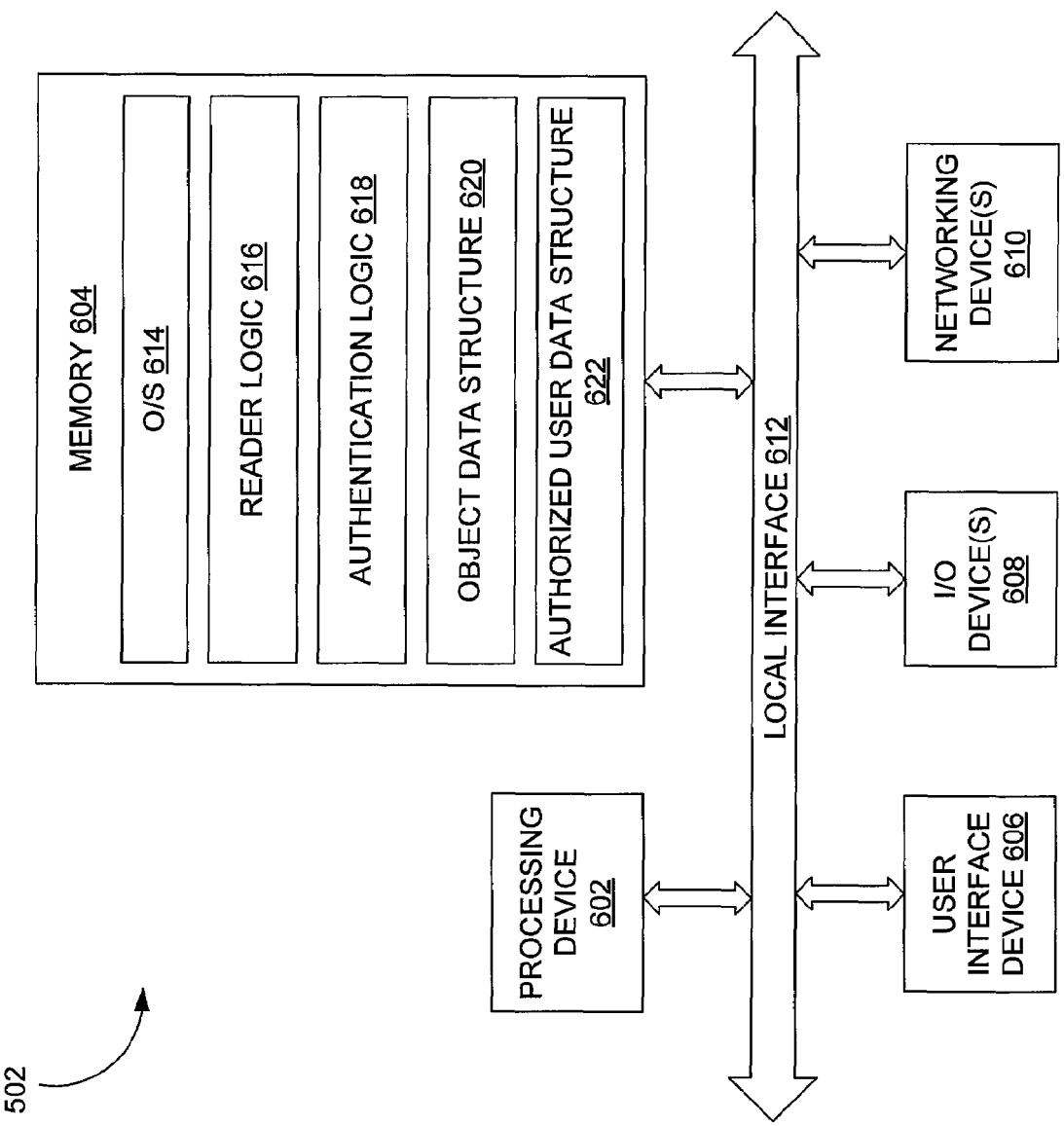

FIG. 6 is a block diagram that illustrates an embodiment of an architecture for the computing device 502 shown in FIG. 5. As indicated in FIG. 5, the computing device 502 comprises a processing device 602, memory 604, one or more user interface devices 606, one or more I/O devices 608, and one or more networking devices 610, each of which is connected to a local interface 612. The processing device 602 can include any custom made or commercially available processor, a central processing unit (CPU) or an auxiliary processor among several processors associated with the computing device 502, a semiconductor based microprocessor (in the form of a microchip), or a macroprocessor. The memory 604 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 606 comprise those components with which the user can interact with the computing device 502, such as user interface 112. Further, user interface devices 606 may also work in cooperation with GUI-display rendering software resident in the memory 604 (e.g., as part of reader logic 616, authentication logic 618, or as a separate module). Where the computing device 502 comprises a server computer or similar device, these components can comprise those typically used in conjunction with a PC such as a keyboard and mouse.

The one or more I/O devices 608 comprise components used to facilitate connection of the computing device 502 to other devices, for instance, one or more serial, parallel, small system interface (SCSI), universal serial bus (USB), or IEEE 1394 (e.g., Firewire™) connection elements, among other elements. The I/O devices also generically represent various components (and corresponding connections and/or interfaces) shown in and described in association with FIG. 5, including the power source 508, electro-magnetic locks 110 or 210, and sensor 107. The networking devices 610 comprise the various components used to transmit and/or receive data over a network 510, where provided. By way of example, the networking devices 610 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 604 normally comprises various programs (in software and/or firmware) including an operating system (O/S) 614, reader logic 616, authentication logic 618, object data structure 620, and authorized user data structure 622. Other software not shown includes logic (e.g., data structures and/or programming code) to assist in inventory management. The O/S 614 controls the execution of programs, including the reader logic 616, authentication logic 618, object data structure 620, and authorized user data structure 622, and provides scheduling, input-output control, file and data management, memory management, and communication control and related services.

The reader logic 616 controls the scanning process described herein. Accordingly, the reader logic 616 effects the generation and transmission of excitation signals from the transceiver control 504 and provides for the reading and interpretation of data corresponding to response signals received from tags 122 by the transceiver control 504 to determine whether an object has been returned or removed. After an enclosure is closed (or locked in some embodiments), the reader logic 616 implements, in cooperation with the transceiver control 504, scanning of the interior of the enclosure, and compares the received tag information (e.g., serial number data) with expected tag information (e.g., serial number data) stored in the object data structure 620 (which in one embodiment, comprises a database of identifying information corresponding to objects (and their associated tags) that are expected to be in the enclosure in view of a previous association process with associated tags of that enclosure). Based on the comparison, the reader logic 616 determines whether an object has been removed or returned. The reader logic 616 also provides for functionality involved in associating tags 122 to objects, including the provision of various GUIs that are provided at start-up or responsive to object updates (e.g., new objects to enter into an enclosure or remove obsolete objects) to enable a user to accomplish association to objects and populate the object data structure 620 with data corresponding to the new objects.

The authentication logic 618 controls access to an enclosure in cooperation with the user interface 112 and receives information via the user interface 112 and electro-magnetic lock 110. That is, when an enclosure is locked, and a user seeks access to the enclosure, the user enters information at the user interface 112. Upon receipt of user information, the authentication logic 618 compares the entered information (e.g., one or more of name, pin number, password, social security number, biometric data, etc.) with information in the authorized user data structure 622 (which in one embodiment, comprises a database of identification information for personnel that are permitted to access objects from within an enclosure). If a match is found, the authentication logic 618 signals the electro-magnetic lock 110 to disengage and hence allow access by that individual to the interior of the enclosure. If a match is not found, the authentication logic 618 maintains engagement of the electro-magnetic locks 110 or 210.

The reader logic 616 and authentication logic 618 can be implemented in hardware, software, firmware, or a combination thereof. In one embodiment, the reader logic 616 and authentication logic 618 are implemented in software that is stored in a memory and that is executed by a suitable instruction execution system. If implemented in hardware, as in an alternative embodiment, the functionality of the reader logic 616 and authentication logic 618 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The reader logic 616 and authentication logic 618, which in one embodiment comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 7:
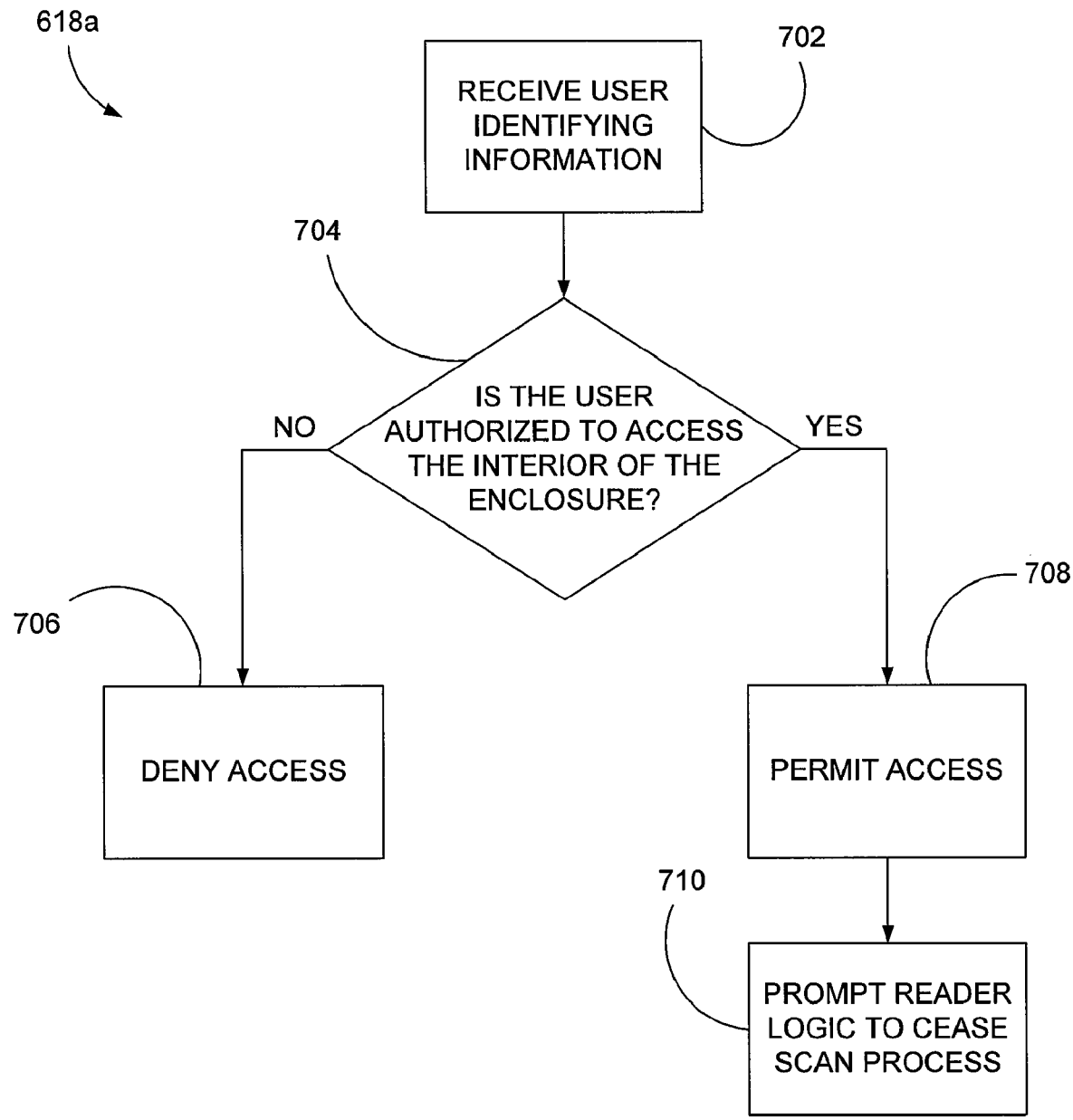
FIG. 7 is a flow diagram that illustrates an authentication method embodiment of the object tracking systems shown in FIGS. 1A-3.

Having described various embodiments of object tracking systems 100a-100c, it can be appreciated by one having ordinary skill in the art in the context of this disclosure that one method embodiment, referred to method 618a and shown in FIG. 7, enables authentication of a user to enable or deny access to the interior of an enclosure. Such a method 618a, implemented in one embodiment by the authentication logic 618, comprises receiving user identifying information entered by a user at the user interface 112 according to one or more of the mechanisms described above (702). Further, the method 618a determines, based on querying an authorized user data structure 622, whether the user is authorized to access the interior of a particular enclosure (704). If the user is not authorized to access the interior of the enclosure, the method 618a denies access (706). Such a denial can take the form of the maintenance of an engagement signal to the electro-magnetic lock 110 (or in other configurations, abstaining from sending a signal to disengage the lock 110), and optionally one or more of the following: a message sent to the GUI 130 that alerts the user that access is denied, an alert sent to an administrator located remotely of an unauthorized attempt at access, among others.

If the user is authorized to access the interior of the enclosure, the method 618a permits access to the interior of the enclosure by signaling to the electro-magnetic lock 110 to unlock the door(s) and/or drawer(s) of the enclosure to enable access (708). The method 618a also signals to the reader logic 616 (responsive to communication by sensor 107) that authentication has been achieved, which prompts the reader logic 616 to cease the scanning process (710). In some embodiments, the cessation of the scanning process is prompted by disengagement (unlocking) or the actual opening (as opposed to unlocking) of a drawer or door of the enclosure as sensed by a sensor 107 (or current sensor), which communicates the change in opening/closing status to the reader logic 616. In some embodiments, the authentication logic 618, through cooperation with the user interface device 606, senses the disengagement (e.g., via well-known current sensing capabilities) of the lock 110, and communicates the change in status to the reader logic 616 to enable the cessation of the scanning process. In some embodiments, the reader logic 616 senses the disengagement through cooperation with the user interface device 606.

The resumption of scanning occurs according to the mechanisms described above. In one embodiment, the sensor 107 senses door closure, and communicates this status to the reader logic 616, which commences the scan process.

Figure 8:
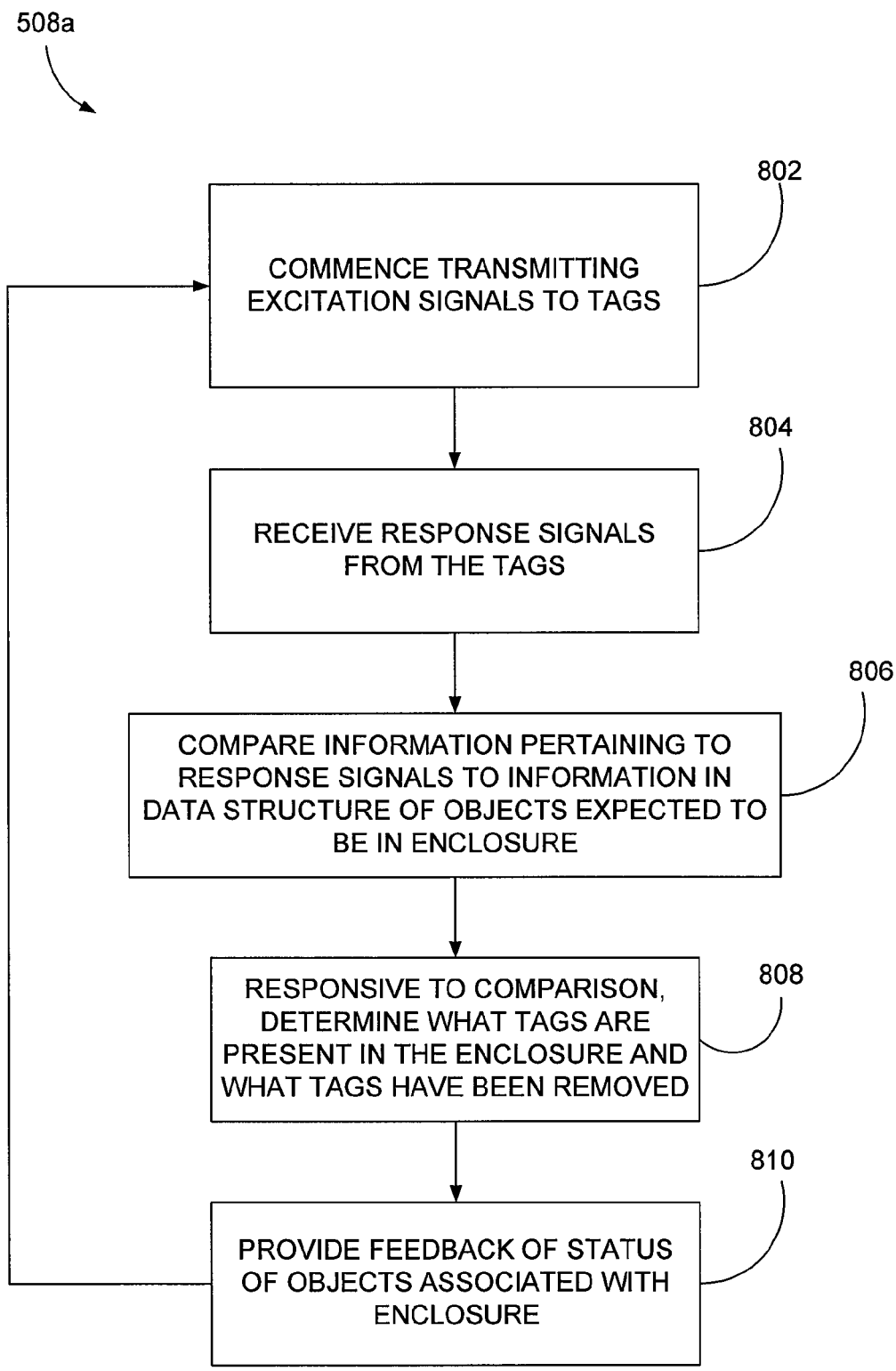
FIG. 8 is a flow diagram that illustrates a scanning method embodiment of the object tracking systems shown in FIGS. 1A-3.

Having described various embodiments of object tracking systems 100a-100c, it can be appreciated by one having ordinary skill in the art in the context of this disclosure that one scanning method embodiment for a given enclosure, referred to method 508a and shown in FIG. 8, can be implemented by the reader logic 616 in cooperation with the transceiver control 504 (the latter two components collectively also referred to as a reader 508). The method 508a comprises, responsive to sensing or receiving status information corresponding to the door(s) and/or drawers(s) of an enclosure being closed (or locked in some embodiments), commencing transmitting excitation signals to one or more tags 122 (802). The method 508a further comprises receiving response signals from the one or more tags 122 (804), and comparing information pertaining to the response signals with information in an object data structure 620 comprising information about objects and associated tags 122 expected to be located in the enclosure (806). The method 508a further comprises, responsive to the comparison, determining which tags 122 are present in the enclosure and which tags have been removed (808). The method 508a further comprises providing feedback of the status of objects associated with the enclosure (810). The method 508a repeats the aforementioned process until the door(s) and/or drawer(s) are opened upon successful authentication to the interior of the enclosure, unlocking of the door(s) and/or drawer(s), or successful authentication.

It can be appreciated in the context of the above disclosure that one method embodiment, referred to as object tracking method 100d and shown in FIG. 9, comprises scanning an interior space of an enclosure, the enclosure having at least one radio frequency identification (RFID) tag and at least one object associated with the at least one RFID tag (902), receiving an indication that a user is attempting access to the interior space (904), and responsive to receiving the indication, determining whether access to the interior space is permitted by the user (906).

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure. Further, though described in the context of the specific architectures described in FIGS. 1A-6, it can be appreciated in the context of this disclosure that the various methods described herein are not limited to the structures illustrated in FIGS. 1A-6.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosed systems and methods. All such modifications and variations are intended to be included herein within the scope of this disclosure and protected by the following claims.

At least the following is claimed:

1. A method, comprising:
   receiving a first excitation signal at a switch that includes a radio frequency identification (RFID) tag, the RFID tag indicating presence of an object at the switch by sending a response signal;
   permitting removal of the object from the switch; and
   preventing the RFID tag from receiving a second excitation signal by situating a disabling material into close proximity of the RFID tag.

2. The method of claim 1, wherein situating the disabling material into close proximity of the RFID tag further comprises bringing the disabling material in physical contact with the RFID tag.

3. The method of claim 1, wherein the close proximity comprises a separation distance between the RFID tag and the disabling material of approximately 0.125 inches.

4. The method of claim 1, wherein the close proximity comprises a separation distance between the RFID tag and the disabling material of less than approximately 0.125 inches.

5. The method of claim 1, wherein the RFID tag is configured to receive the second excitation signal if the RFID tag is not in close proximity to the disabling material.

6. The method of claim 1, wherein the disabling material is selected from the group including at least one of the following: a metallic material and a fluid encased by a non-metallic material.

7. The method of claim 1, wherein the disabling material comprises a material that renders an ability to read information from the RFID tag ineffective.

8. A method, comprising:
   sending an excitation signal to a switch, the switch including a disabling material and a radio frequency identification (RFID) tag, the RFID tag indicating presence of an object at the switch;
   determining whether a reply to the excitation signal is received; and
   in response to determining that the reply to the excitation signal is not received, determining that the object was removed from the switch,
   wherein the disabling material is situated in close proximity of the RFID tag.

9. The method of claim 8, further comprising the step of receiving information identifying to the RFID tag if the reply to the excitation signal is received.

10. The method of claim 9, further comprising:
    comparing the information identifying the RFID tag with stored information;
    determining whether information identifying the RFID tag matches the stored information; and
    determining an RFID tag that did not reply.

11. The method of claim 10, further comprising, in response to determining the RFID tag that did not reply, indicating the object that was removed from the switch.

12. The method of claim 10, further comprising, in response to determining the RFID tag that did not reply, notifying a user that the object was removed from the switch.

13. The method of claim 8, wherein no reply is received if the disabling material is in contact with the RFID tag.

14. The method of claim 8, wherein the close proximity comprises a separation distance between the RFID tag and the disabling material of approximately 0.125 inches.

15. The method of claim 8, wherein the close proximity comprises a separation distance between the RFID tag and the disabling material of less than approximately 0.125 inches.

16. The method of claim 8, wherein the disabling material is selected from the group including at least one of the following: a metallic material and a fluid encased by a non-metallic material.

17. The method of claim 8, wherein the disabling material comprises a material that renders an ability to read information from the RFID tag ineffective.

18. A radio frequency identification (RFID) switch, comprising:
    a first member comprising a disabling material;
    a second member in moveable relationship with respect to the first member; and
    a radio frequency identification (RFID) tag coupled to the second member, the first member being removably coupled to an object such that when the object is uncoupled from the first member, the disabling material of the first member is introduced into proximity of the RFID tag coupled to the second member thereby preventing the RFID tag from communicating a signal to a desired reader.

19. The switch of claim 18, wherein the first member is hingably coupled to the second member.

20. The switch of claim 18, wherein the first member and the second member are each comprised substantially of a non-metallic material.

21. The switch of claim 18, wherein the disabling material comprises a metallic material.

22. The switch of claim 18, wherein the disabling material comprises a fluid encased by a non-metallic material.

23. The switch of claim 18, wherein when the first member is loaded with an object, the RFID tag communicates the signal to the desired reader, and wherein when the first member is unloaded, the RFID tag is prevented from communicating the signal to the desired reader.

24. The switch of claim 23, wherein when the RFID tag communicates the signal to the desired reader, information corresponding to the RFID tag can be read, and wherein when the RFID tag is prevented from communicating the signal to the desired reader, the information corresponding to the RFID tag cannot be read.

25. The switch of claim 18, wherein the RFID tag is selected from the group including at least one of the following: active tag, passive tag, and semi-passive tag.

26. A method, comprising:
    receiving an excitation signal at a switch associated with a radio frequency identification (RFID) tag and a disabling material; and
    changing a state of the RFID tag with the switch based on proximity of the disabling material to the RFID tag, wherein changing comprises changing the RFID tag to a first state if the disabling material is in close proximity to the RFID tag, wherein the close proximity comprises a separation distance between the RFID tag and the disabling material of approximately 0.125 inches.

27. The method of claim 26, wherein the disabling material is selected from the group including at least one of the following: a metallic material and a fluid encased by a non-metallic material.

28. A system, comprising:
    means for receiving an excitation signal at a switch associated with a radio frequency identification (RFID) tag and a disabling material; and
    means for changing a state of the RFID tag with the switch based on proximity of the disabling material to the RFID tag, wherein changing comprises changing the RFID tag to a first state if the disabling material is in close proximity to the RFID tag, wherein the close proximity comprises a separation distance between the RFID tag and the disabling material of approximately 0.125 inches.

29. The system of claim 28, wherein the disabling material is selected from the group including at least one of the following: a metallic material and a fluid encased by a non-metallic material.

30. A method, comprising:
    sending an excitation signal to a switch associated with a radio frequency identification (RFID) tag and a disabling material; and
    receiving a response to the excitation signal based on a separation distance between the disabling material and the RFID tag, the separation distance based on a change in the switch, wherein no response is received if the disabling material is in close proximity to the RFID tag, wherein the close proximity comprises a separation distance between the RFID tag and the disabling material of approximately 0.125 inches.

31. The method of claim 30, wherein the disabling material is selected from the group including at least one of the following: a metallic material and a fluid encased by a non-metallic material.

32. A system, comprising:
    means for sending an excitation signal to a switch associated with a radio frequency identification (RFID) tag and a disabling material; and
    means for receiving a response to the excitation signal based on a separation distance between the disabling material and the RFID tag, the separation distance based on a change in the switch, wherein no response is received if the disabling material is in close proximity to the RFID tag, wherein the close proximity comprises a separation distance between the RFID tag and the disabling material of approximately 0.125 inches.

33. The system of claim 32, wherein the disabling material is selected from the group including at least one of the following: a metallic material and a fluid encased by a non-metallic material.

* * * * *